(12) United States Patent
Moriyama

(10) Patent No.: US 11,498,398 B2
(45) Date of Patent: Nov. 15, 2022

(54) SIDE DOOR STRUCTURE AND SIDE DOOR MANUFACTURING METHOD OF VEHICLE

(71) Applicant: MAZDA MOTOR CORPORATION, Hiroshima (JP)

(72) Inventor: Yukihiro Moriyama, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 79 days.

(21) Appl. No.: 17/203,918

(22) Filed: Mar. 17, 2021

(65) Prior Publication Data

US 2021/0387517 A1    Dec. 16, 2021

(30) Foreign Application Priority Data

Jun. 10, 2020   (JP) .............................. JP2020-100857

(51) Int. Cl.
*B60J 5/04*    (2006.01)

(52) U.S. Cl.
CPC ........... *B60J 5/0426* (2013.01); *B60J 5/0412* (2013.01)

(58) Field of Classification Search
CPC . B60J 5/042; B60J 5/0426; B60J 5/044; B60J 5/0423; B60J 5/0412
USPC ..................................................... 296/146.6
See application file for complete search history.

(56) References Cited

U.S. PATENT DOCUMENTS

| 7,581,779 | B2 * | 9/2009 | Baumgart .............. | B60J 5/0416 49/502 |
| 7,744,146 | B2 * | 6/2010 | Lee ........................ | B60J 5/0411 296/146.6 |
| 2010/0066122 | A1 * | 3/2010 | Eckart .................... | B60J 5/0404 359/871 |

FOREIGN PATENT DOCUMENTS

JP          409123766 A      5/1997

* cited by examiner

*Primary Examiner* — Joseph D. Pape
*Assistant Examiner* — Veronica M Shull
(74) *Attorney, Agent, or Firm* — Studebaker & Brackett PC

(57) ABSTRACT

There are provided an outer member, an inner member connected to the outer member, door components including a door glass provided between the outer member and the inner member, and a reinforcement outer member extending in a vehicle longitudinal direction at an upper end portion of the inner member which is positioned on an outward side, in a vehicle width direction, of the door glass. The outer member includes an outer panel and an annular frame member which is joined to an outer peripheral portion of the outer panel by a hemming method, the reinforcement outer member is connected to the inner member at its front and rear end portions, and a seal outer member to seal a gap between the outer member and the door glass is attached to an upper frame portion fastened to the reinforcement outer member.

10 Claims, 14 Drawing Sheets

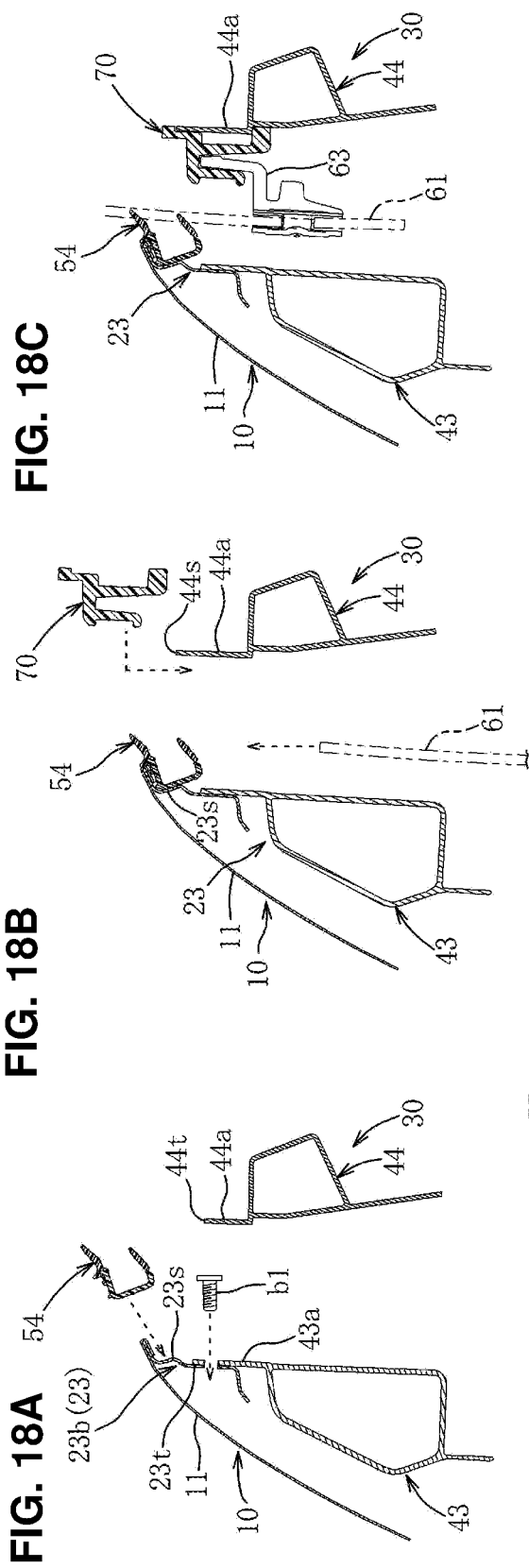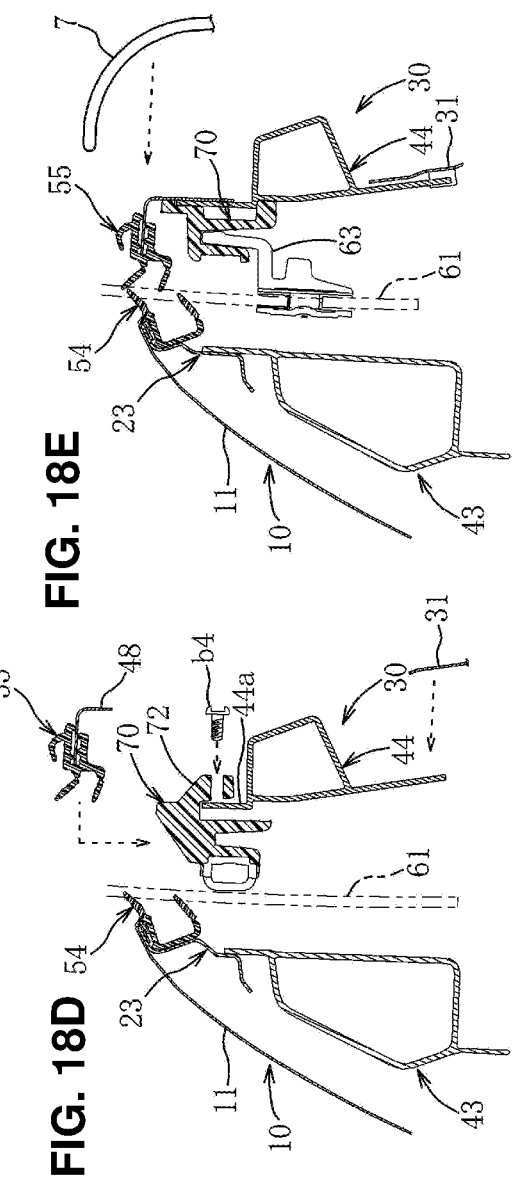

SIDE DOOR STRUCTURE AND SIDE DOOR MANUFACTURING METHOD OF VEHICLE

BACKGROUND OF THE INVENTION

The present invention relates to a side door structure and a side door manufacturing method of a vehicle which comprises a beltline-reinforcement outer member extending in a vehicle longitudinal direction at an upper end portion of an inner member and a beltline-seal outer member supported at the beltline-reinforcement outer member.

Conventionally, a side door structure which comprises an outer panel forming a design surface portion, an inner panel joined to an outer peripheral portion of the outer panel by a hemming method, and door components (accessories), such as a door glass, attached to the inner panel is known. Further, a beltline-seal outer member (hereafter, referred to as a seal outer member, simply) and a beltline-seal inner member which slide on the door glass with a specified contact pressure, respectively, are arranged at a beltline portion of a side door in order to prevent water, noise, outside air, or the like from coming into a cabin.

The seal outer member generally comprises a synthetic-resin-made base portion having a core material embedded therein and plural rubber-made seal lips (hereafter, referred to as lip portions, simply) provided to protrude from the base portion. The base portion is attached to an outer end portion of the outer panel from an upper side by caulking or the like. Accordingly, since the seal outer member is exposed to an outside of the outer panel as a whole, the base portion becomes visible, in addition to the lip portions, from the outside, thereby causing deterioration of appearance. Therefore, technologies to prevent visibility of the seal outer member from the outside have been proposed.

A beltline molding (seal outer member) for an automobile disclosed in Japanese Patent Laid-Open Publication No. H09-123766 comprises a downward flange which is configured such that an upper end portion of an outer panel is bent and extends downwardly, a hard-synthetic-resin-made molding body (base portion), and a soft-synthetic-resin-made drainer (lip portion) which extends obliquely inwardly-and-upwardly from the molding body, wherein plural fastener holes are formed at the downward flange and plural fastener portions which are provided to integrally protrude outwardly from the molding body are fit into these plural fastener holes, respectively.

The beltline molding for the automobile disclosed in the above-described patent document is configured such that the base portion of the seal outer member is arranged at an inner-peripheral side lower portion which is located below the upper end portion of the outer panel and the lip portion is arranged at an outer-peripheral side upper portion which is located above the upper end portion of the outer panel. Thereby, the visibility of the base portion of the seal outer member from the outside is prevented. However, according to the technology of the above-described patent document, the seal outer member is supported at the downward flange of the outer panel which is made of a thin plate and has the low rigidity via the fastener portions, that is, the structure of this technology constitutes a cantilever supporting structure. Accordingly, there is a concern that the appropriate seal performance may not be secured.

Since the lip portion of the seal outer member contacts the door glass with the specified contact pressure all the time, a reaction force applied from the door glass is transmitted to the base portion while the door glass moves vertically. In a case where the seal outer member is cantilever-supported, since the attachment rigidity of the base portion is low, an attachment position of the base portion is displaced according to the vertical movement of the door glass, so that the contact pressure of the lip portion against the door glass cannot be maintained at a necessary pressure. Consequently, there is a concern that the seal performance may be deteriorated. That is, it is not easy to compatibly attain improvement of the appearance and securement of the seal performance.

SUMMARY OF THE INVENTION

An object of the present invention is to provide a side door structure and a side door manufacturing method of a vehicle which can compatibly attain the improvement of the appearance and the securement of the seal performance.

The present invention is a side door structure of a vehicle, comprising an outer member, an inner member connected to the outer member, door components including a door glass provided between the outer member and the inner member, and a beltline-reinforcement outer member extending in a vehicle longitudinal direction at an upper end portion of the inner member which is positioned on an outward side, in a vehicle width direction, of the door glass, wherein the outer member includes an outer panel and an annular frame member which is joined to an outer peripheral portion of the outer panel by a hemming method, the beltline-reinforcement outer member is connected to the inner member at a front end portion and a rear end portion, in the vehicle longitudinal direction, thereof, and a beltline-seal outer member to seal a gap between the outer member and the door glass is supported at the beltline-reinforcement outer member.

According to the present invention, since the side door structure comprises the beltline-reinforcement outer member extending in the vehicle longitudinal direction at the upper end portion of the inner member which is positioned on the outward side, in the vehicle width direction, of the door glass, the rigidity of a portion around the upper end portion of the inner member can be secured. Further, since the outer member includes the outer panel and the annular frame member which is joined to the outer peripheral portion of the outer panel by the hemming method, the outer panel and the frame member can be joined without generating wrinkles or distortion at the outer panel forming the design surface portion. Since the beltline-reinforcement outer member is made of a member which has the higher rigidity than the outer panel and connected to the inner member which has the higher rigidity than the outer panel at its front-and-rear end portions, the front-and-rear end portions of the beltline-reinforcement outer member can be supported firmly at the upper end portion of the inner member. Moreover, since the beltline-seal outer member to seal the gap between the outer member and the door glass is supported at the beltline-reinforcement outer member, the beltline-seal outer member can be arranged at the inner-peripheral side lower portion of the outer panel, so that it can be prevented that the beltline-seal outer member is visible from the outside. Also, since the beltline-seal outer member is supported at the beltline-reinforcement outer member having the high rigidity, the attachment rigidity of the beltline-seal outer member can be made higher than a case where it is attached to a flange portion of the outer panel which is configured in a cantilever state by being bent, so that the contact pressure of the lip portion against the door glass can be secured.

In an embodiment of the present invention, the beltline-reinforcement outer member is formed by extrusion molding so as to have a closed-cross section, the frame member includes a connecting member which comprises a hem portion which is joined to an upper-side edge portion of the outer panel by hemming method and a connection wall portion which is provided to extend below the hem portion and attached to the beltline-seal outer member, and the seal-reinforcement outer member is attached to the beltline-reinforcement outer member via the connecting member. According to this embodiment, the beltline-seal outer member can be attached to the connecting member which is configured such that its upper portion is supported at the outer panel and its lower portion is supported at the beltline-reinforcement outer member, so that the attachment rigidity of the beltline-seal outer member can be further increased.

In another embodiment of the present invention, the connecting member is configured such that an inward end portion, in the vehicle width direction, of the hem portion is formed substantially in a curved shape along the door glass and the connection wall portion is formed substantially in a linear shape along a vertical wall portion which extends upwardly from a hollow portion of the beltline-reinforcement outer member, the beltline-seal outer member includes a pair of upper-and-lower lip portions which are contactable with the door glass and a base portion which connects respective outward portions, in the vehicle width direction, of the pair of lip portions, and the base portion is attached to the connection wall portion which is arranged on the outward side, in the vehicle width direction, of the hem portion. According to this embodiment, the beltline-seal outer member which has substantially the curved shape along the door glass can be supported at the nearly-linear vertical wall portion via the connection wall portion.

In another embodiment of the present invention, the connection wall portion comprises plural seal attachment portions where the beltline-seal outer member is fastened and plural reinforcement attachment portions which are fastened to the vertical wall portion, and boundary portions between the plural seal attachment portions and the plural reinforcement attachment portions are formed in a wave shape in a side view. According to this embodiment, the plural seal attachment portions having a nearly curved-shaped cross section and the plural reinforcement attachment portions having a nearly linear-shaped cross section can be allow to coexist inside the connection wall portion with a simple structure.

In another embodiment of the present invention, the side door structure further comprises a beltline-reinforcement inner member extending in the vehicle longitudinal direction at the upper end portion of the inner member which is positioned on an inward side, in the vehicle width direction, of the door glass and a covering member attached to an upper portion of the beltline-reinforcement inner member, and the covering member is configured to be detachable for the beltline-reinforcement inner member. According to this embodiment, the attachment workability of the beltline-seal outer member can be improved.

Another aspect of the present invention is a side door manufacturing method of a vehicle which comprises an outer member, an inner member connected to the outer member, and a beltline-reinforcement outer member extending in a vehicle longitudinal direction at an upper end portion of the inner member which is positioned on an outward side, in a vehicle width direction, of a door glass, the side door manufacturing method comprising steps of forming the outer member by an outer panel and an annular frame member which is joined to an outer peripheral portion of the outer panel by a hemming method, connecting the beltline-reinforcement outer member to the inner member at a front end portion and a rear end portion, in the vehicle longitudinal direction, thereof, and connecting a beltline-reinforcement inner member extending in the vehicle longitudinal direction at the upper end portion of the inner member which is positioned on an inward side, in the vehicle width direction, of the door glass to the inner member at a front end portion and a rear end portion, in the vehicle longitudinal direction, thereof, fastening the inner member to the frame member from the inward side, in the vehicle width direction, fastening a beltline-seal outer member to seal a gap between the outer member and the door glass to frame member from the inward side, in the vehicle width direction, and attaching a detachable covering member to an upper portion of the beltline-reinforcement inner member.

According to this aspect of the present invention, since the beltline-seal outer member is arranged at the upper end portion of the inner member and fastened to the beltline-reinforcement outer member connected to the inner member at its front-and-rear end portions, the attachment rigidity of the beltline-seal outer member can be increased, so that the beltline-seal outer member can be arranged at the inner-peripheral side lower portion of the outer panel. Further, since the detachable covering member is attached to the upper portion of the beltline-reinforcement inner member, the beltline-seal outer member can be attached after connecting the outer member and the inner member, so that the workability can be improved.

The present invention will become apparent from the following description which refers to the accompanying drawings.

BRIEF DESCRIPTION OF THE DRAWINGS

FIG. 8A being the one, when viewed from an inward side, in a vehicle width direction; FIG. 8B being the one, when viewed from an outward side, in the vehicle width direction.

FIG. 12A being the one, when viewed from the inward side, in the vehicle width direction; FIG. 12B being the one, when viewed from the outward side, in the vehicle width direction.

FIGS. 18A-18E are explanatory diagrams of the manufacturing steps of the side door.

DETAILED DESCRIPTION OF THE INVENTION

Figure 1:
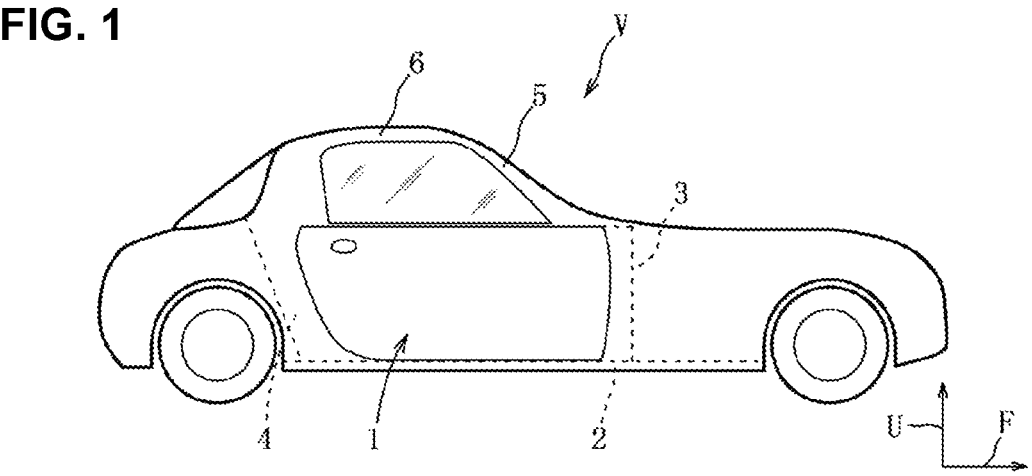
FIG. 1 is a right side view of a vehicle which is equipped with a side door structure according to an embodiment.

Hereafter, an embodiment of the present invention will be described referring to the drawings. Herein, the following description of the embodiment relates to just one example and does not limit applications or usages of the present invention.

The present embodiment will be described referring to FIGS. 1-19. As shown in FIG. 1, a vehicle V of the present embodiment is a two-door hard top type of passenger car and comprises a pair of right-and-left sashless (non-sash) type of side doors 1. This vehicle V has a right-and-left symmetrical structure, and therefore a right-side part of the vehicle will be described primarily. In the figures, an arrow F shows a forward direction, an arrow OUT shows an outward direction, in a vehicle width direction, and an arrow U shows an upward direction, respectively.

The vehicle V comprises a side sill 2 extending in a vehicle longitudinal direction, a hinge pillar 3 extending upwardly from the side sill 2, a center pillar 4 extending upwardly from the side sill 2 on a rearward side of the hinge pillar 3, a front pillar 5 extending obliquely upwardly-and-rearwardly from an upper end portion of the hinge pillar 3, a roof side rail 6 connecting the front pillar 5 and an upper end portion of the center pillar 4, and others. The side door 1 is configured to open and close a door opening portion which is formed by these vehicle-body frame members 2-6.

Figure 2:
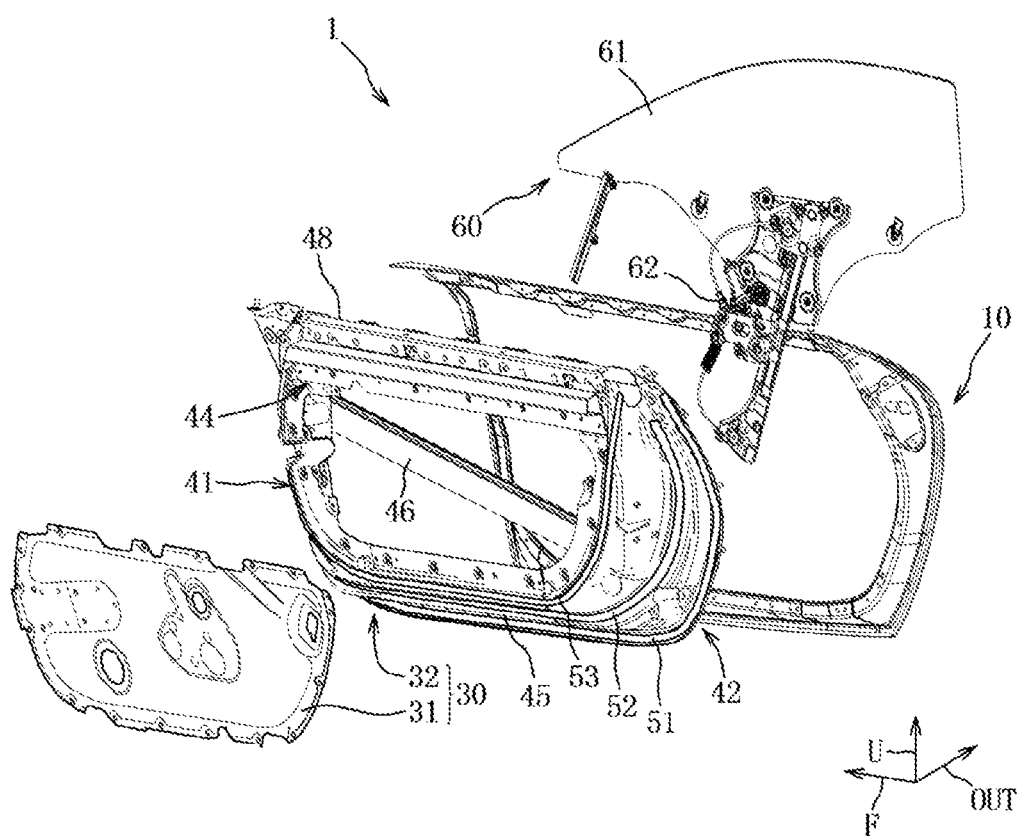
FIG. 2 is an exploded perspective view of the side door.

As shown in FIG. 2, the side door 1 comprises mainly an outer member 10 which constitutes an outward-side portion, in the vehicle width direction, thereof, an inner member 30 which constitutes an inward-side portion, in the vehicle width direction, thereof, and functional door components (accessories) including an aluminum-alloy-made impact bar 46, a door glass unit 60, and others. The outer member 10 and the inner member 30 are respectively made of a lightweight alloy material, such as aluminum alloy, primarily.

Figure 3:
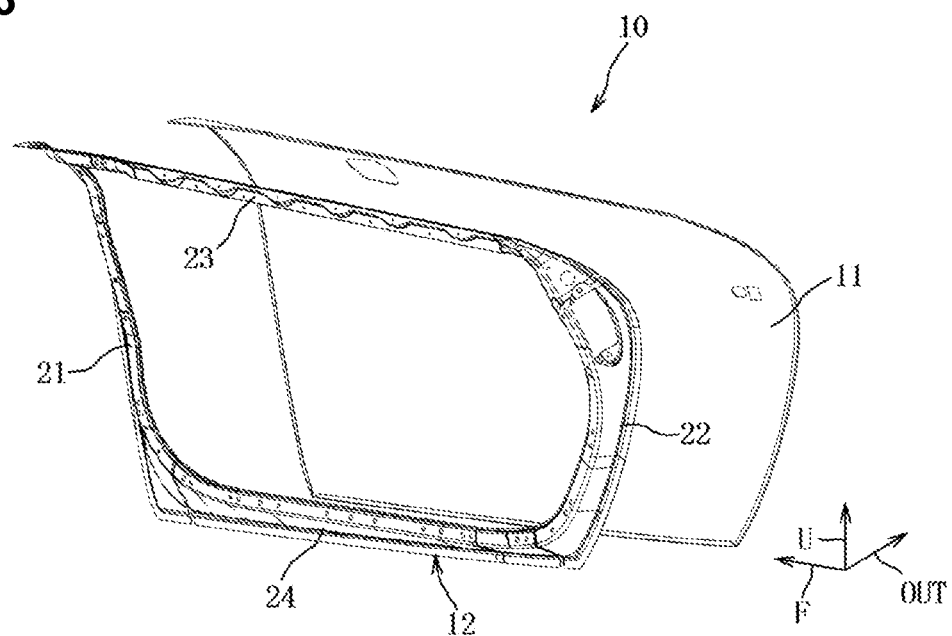
FIG. 3 is an exploded perspective view of an outer member.

First, the outer member 10 will be described. As shown in FIG. 3, the outer member 10 includes an outer panel 11 which forms a curved design surface portion and is formed in a nearly rectangular shape in a side view, an annular frame member 12 which is joined to an outer peripheral portion of the outer panel 11 by a hemming method and formed in a nearly rectangular shape in the side view, and others. The outer panel 11 and the frame member 12 are respectively made of a panel of an aluminum-alloy material, e.g., formed by pressing a wrought material having the thickness of 0.8 mm.

The frame member 12 comprises a front frame portion 21 which extends in a vertical direction, a rear frame portion 22 which extends in the vertical direction on a rearward side of the front frame portion 21, an upper frame portion 23 (connecting member) which connects the front frame portion 21 and an upper end portion of the rear frame portion 22 in the longitudinal direction, and a lower frame portion 24 which connects the front frame portion 21 and a lower end portion of the rear frame portion 22 in the longitudinal direction. Each of these frame portions 21-24 is provided with a hem portion which is clamped into the outer peripheral edge portion of the outer panel 11 by hemming and a connection wall portion which is fixedly fastened to the inner member 30 by a fastening member b1 (see FIG. 16).

Next, the inner member 30 will be described. As shown in FIG. 2, the inner member 30 includes an inner panel 31 which forms a cabin-side wall portion and is formed in a nearly rectangular shape in the side view, a nearly-rectangular annular frame member 32 which supports the inner panel 31 and various kinds of functional door components and constitutes a frame portion of the side door 1, and others. The inner panel 31 is made of a panel of the aluminum-alloy material, e.g., formed by pressing the wrought material having the thickness of 0.8 mm.

Figure 4:
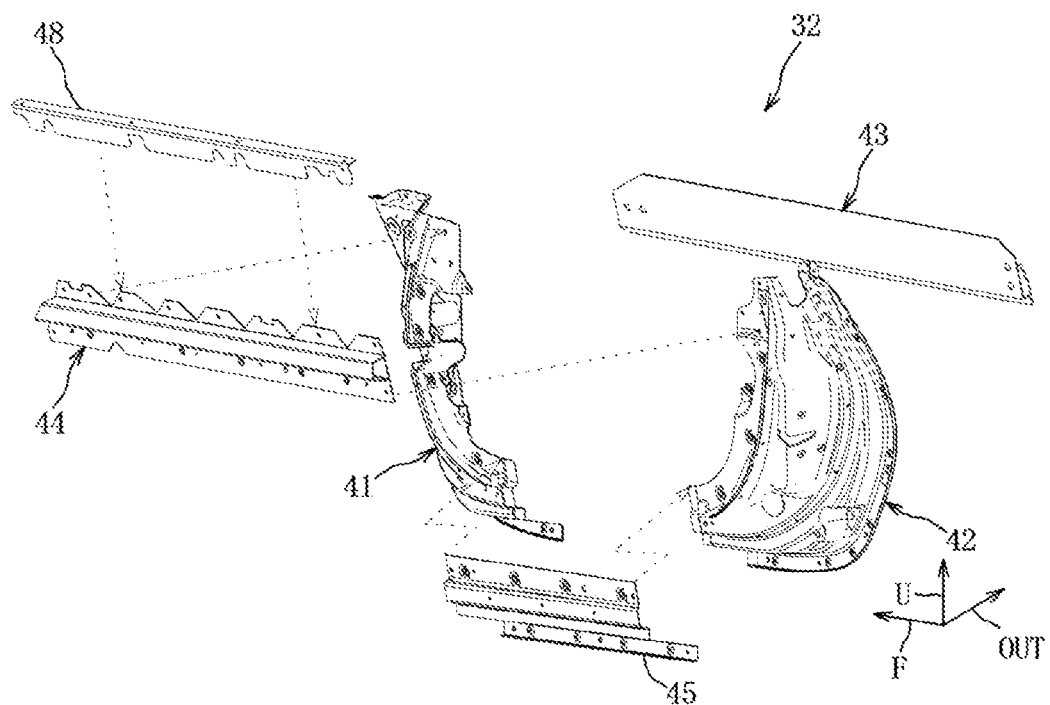
FIG. 4 is an exploded perspective view of a frame member.

As shown in FIG. 4, the frame member 32 comprises a front-side vertical wall portion 41 which extends in the vertical direction, a rear-side vertical wall portion 42 which extends in the vertical direction on the rearward side of the front-side vertical wall portion 41, a beltline-reinforcement outer member (hereafter, referred to as a reinforcement outer member simply) 43 which connects the front-side vertical wall portion 41 and an upper end portion of the rear-side vertical wall portion 42, a beltline-reinforcement inner member (hereafter, referred to as a reinforcement inner member simply) 44 which connects the front-side vertical wall portion 41 and the upper end portion of the rear-side vertical wall portion 42, and a lower wall portion 45 which connects the front-side vertical wall portion 41 and a lower end portion of the rear-side vertical wall portion 42 by a fastening member (not illustrated).

The front-side vertical wall portion 41 and the rear-side vertical wall portion 42 are respectively made of casting using the aluminum-alloy material, e.g., the aluminum-alloy cast having the thickness of 1.5-2.0 mm. The reinforcement outer member 43 and the reinforcement inner member 44 are respectively formed in a nearly straight shape by extrusion molding using the aluminum-alloy material. The lower wall portion 45 is made of the panel of the aluminum-alloy material, e.g., formed by pressing the wrought material having the thickness of 0.8 mm.

Figure 7:
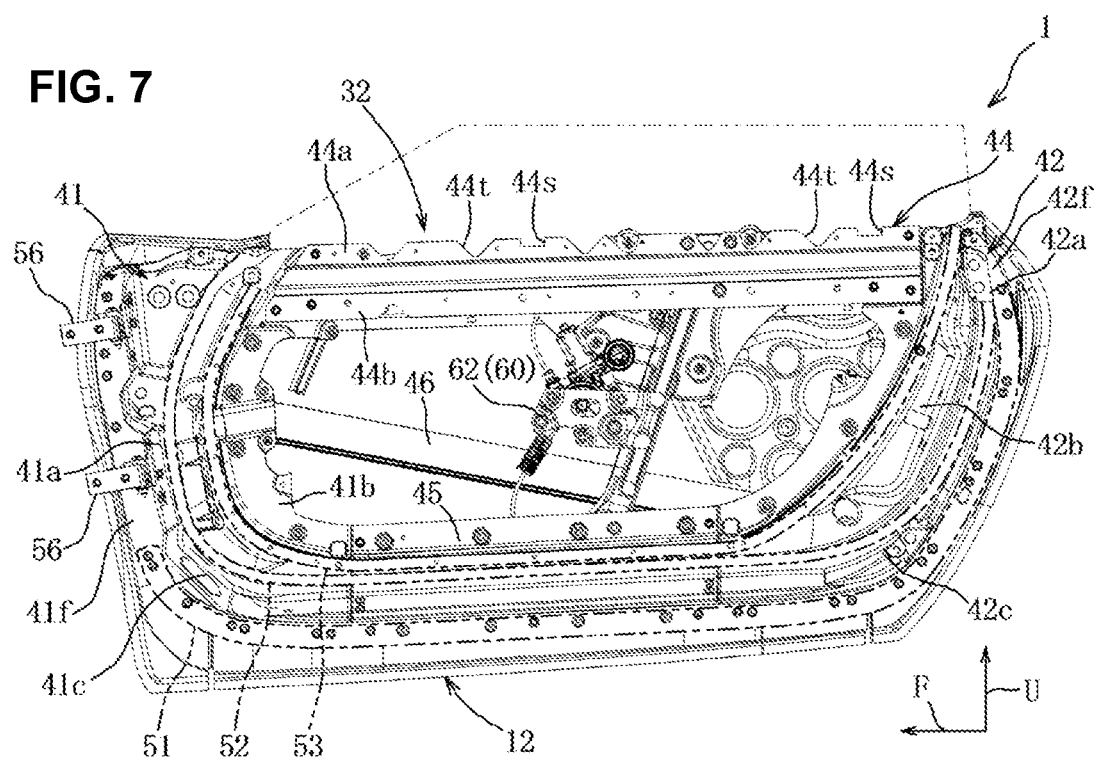
FIG. 7 is the inside view of the side door, in which the outer panel, the inner panel, and a covering member are omitted.

As shown in FIG. 7, the front-side vertical wall portion 41 includes a front wall portion 41a which is perpendicular to the longitudinal direction, an inner wall portion 41b which is continuous to an inward end portion, in the vehicle width direction, of the front wall portion 41a and perpendicular to the vehicle width direction, and a flange portion 41f which is perpendicular to the vehicle width direction at its outer peripheral edge portion, and this front-side vertical wall portion 41 extends rearwardly from a corner portion 41c which is formed at its lower end portion. The rear-side vertical wall portion 42 includes a rear wall portion 42a which is perpendicular to the longitudinal direction, an inner wall portion 42b which is continuous to an inward end portion, in the vehicle width direction, of the rear wall portion 42a and perpendicular to the vehicle width direction, and a flange portion 42f which is perpendicular to the vehicle width direction at its outer peripheral edge portion, and this rear-side vertical wall portion 42 extends forwardly from a corner portion 42c which is formed at its lower end portion. The flange portions 41f, 42f are configured to overlap with and fixedly fastened to a joining wall portion of the frame portions 21-24 by plural detachable fastening members b1.

Next, the reinforcement outer member 43 will be described. The reinforcement outer member 43 is configured to extend linearly in the longitudinal direction at an upper end portion of the inner member 30 and be arranged on the outward side, in the vehicle width direction, of the door glass 61. As shown in FIGS. 4, 6, 8A, 8B and 13-16, the reinforcement outer member 43 is configured to have a closed-cross section (formed in a hollow shape). A front end portion and a rear end portion of the closed-cross section of the reinforcement outer member 43 are fastened to respective outward-side upper end portions, in the vehicle width direction, of the front-side vertical wall portion 41 and the rear-side vertical wall portion 42 by plural fastening members (not illustrated). The reinforcement outer member 43 comprises an outer upper vertical wall portion 43a which extends linearly at an upper end portion of the closed-cross section and an outer lower vertical wall portion 43b which extends linearly at a lower end portion of the closed-cross section.

Figure 9:
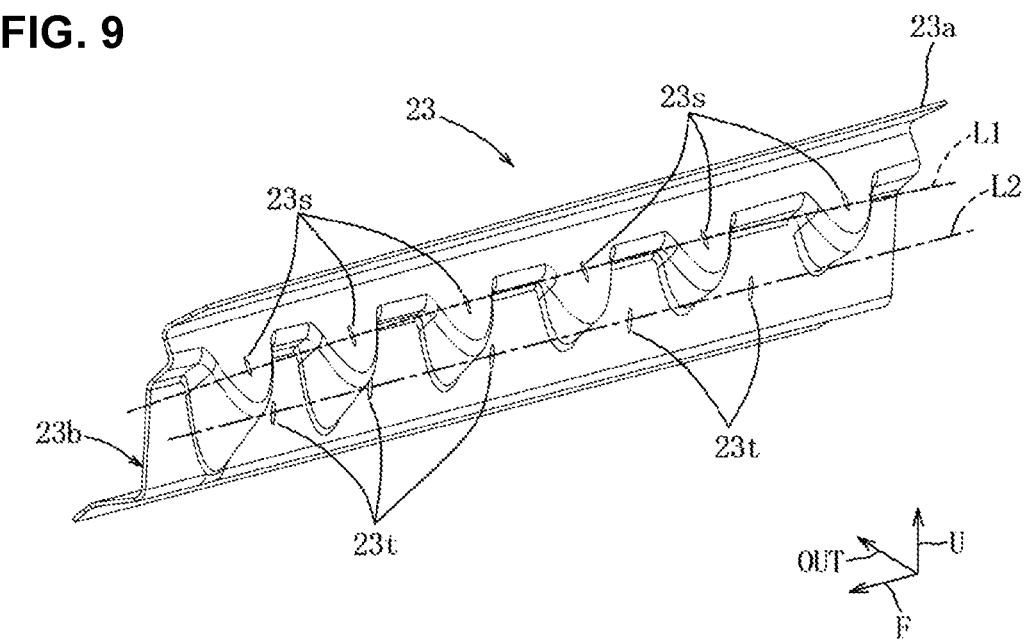
FIG. 9 is a perspective view of an upper frame portion, when viewed from the inward side, in the vehicle width direction.

Plural arc-shaped (wave-shaped) notch portions 43a which are continuous longitudinally are formed at an upper portion of the outer upper vertical wall portion 43a, and the upper frame portion 23 is fastened by the fastening members b1. As shown in FIG. 9, the upper frame portion 23 comprises a hem portion 23a and a connection wall portion 23b. The hem portion 23a substantially horizontally extends inwardly, in the vehicle width direction, and is clamped into the outer peripheral edge portion of the outer panel 11 by hemming. The connection wall portion 23b extends downwardly from an outward end portion, in the vehicle width direction, of the hem portion 23a.

The connection wall portion 23b has plural (e.g., six) seal attachment portions 23s at its upper half part and plural (e.g., five) reinforcement attachment portions 23t at its lower half part. The plural seal attachment portions 23s fix the beltline-seal outer member 54 by plural fastening members b2 (see FIG. 15). An extension line L1 which connects the fastening portions of the plural seal attachment portions 23s extends in a gently-curved shape along the door glass 61 in a plan view, and an extension line L2 which connects the fastening portions of the plural reinforcement attachment portions 23t extends nearly linearly in the plan view.

Figure 8A:
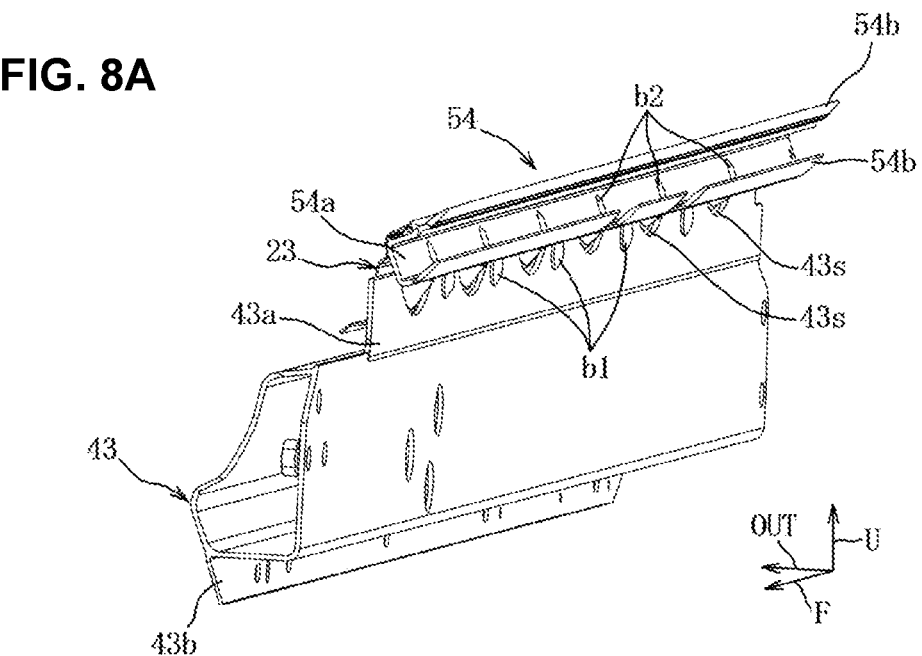
FIGS. 8A and 8B are perspective views of a reinforcement outer member and a seal outer member.
Figure 8B:
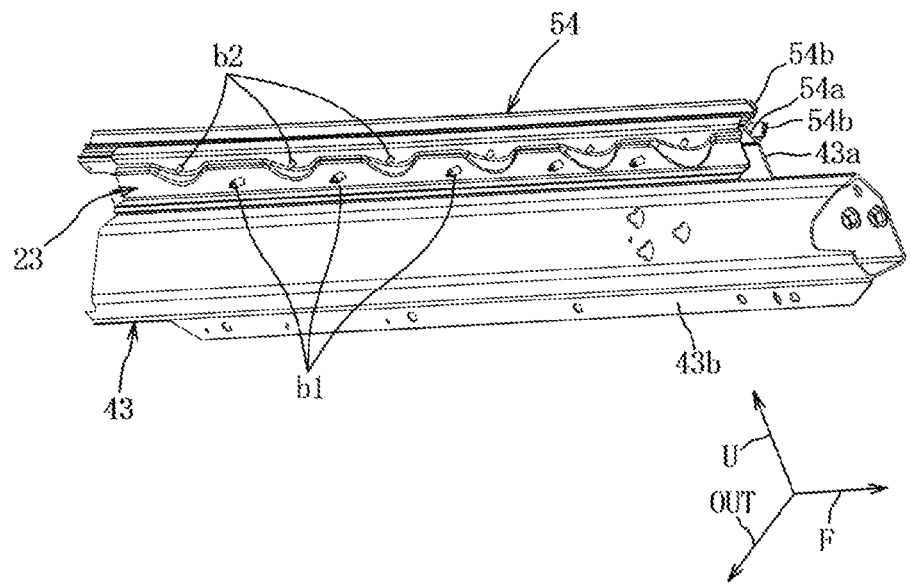
Figure 16:
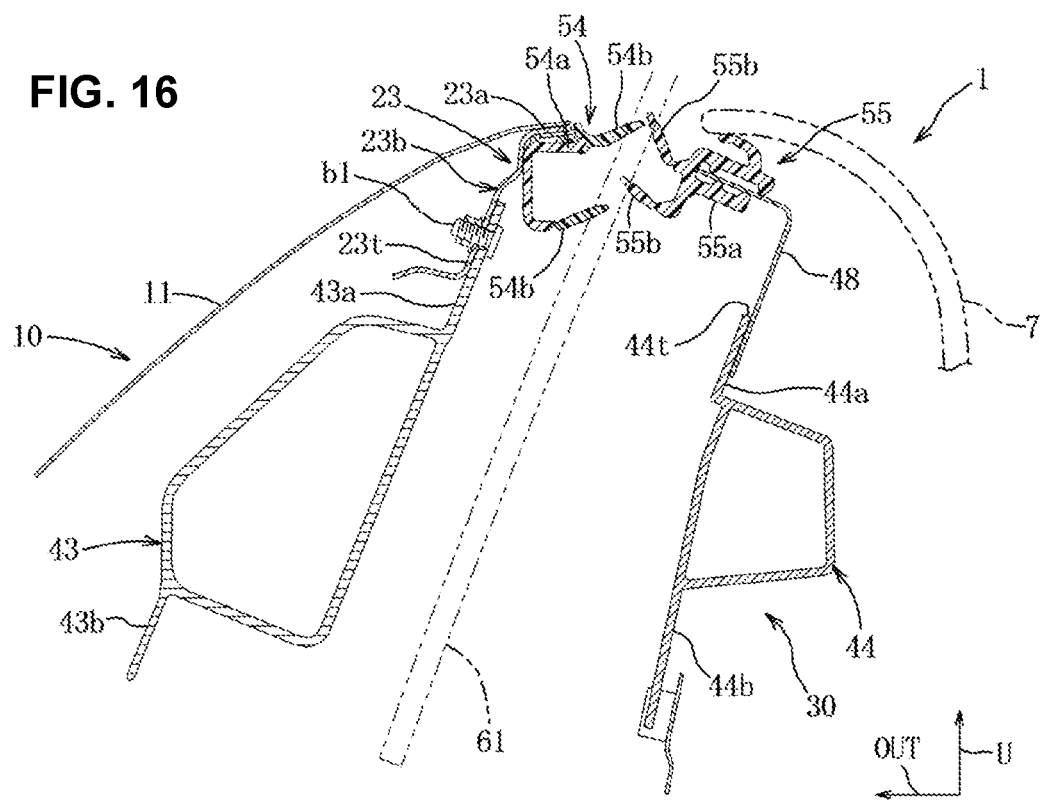
FIG. 16 is a sectional view taken along line XVI-XVI of FIG. 10.
Figure 17:
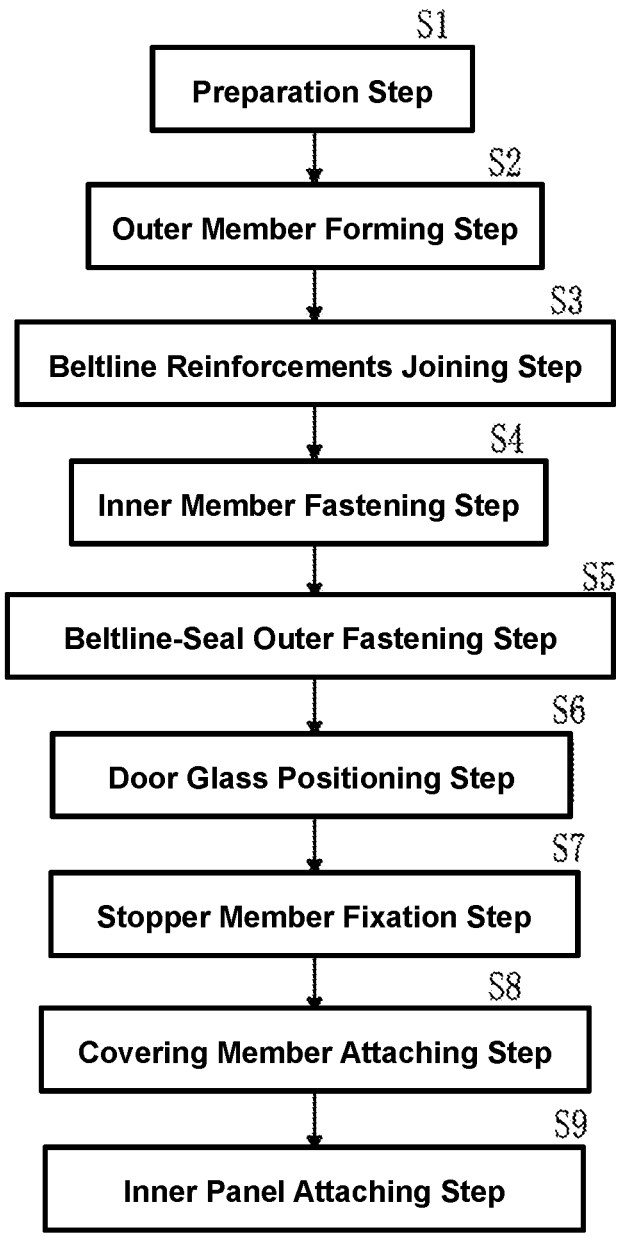
FIG. 17 is a flowchart showing respective manufacturing steps of the side door.

The plural seal attachment portions 23s are respectively formed in a partially-cylindrical shape and configured to protrude inwardly, in the vehicle width direction, from a standard surface of the connection wall portion 23b. Each of the reinforcement attachment portions 23t is formed between adjacent seal attachment portions 23s, and boundary portions between the reinforcement attachment portions 23t and the seal attachment portions 23s are formed in a wave shape in a side view. Therefore, as shown in FIGS. 8A, 8B and 16, in a case where the upper frame portion 23 is fastened to the outer upper vertical wall portion 43a, respective lower portions of the plural seal attachment portions 23s are fit into the plural notch portions 43s. Thereby, an upper portion of the beltline-seal outer member 54 is supported at the outer panel 11 and a lower portion of the beltline-seal outer member 54 is attached to the upper frame portion 23 which is supported at the reinforcement outer member 43.

Next, the reinforcement inner member 44 will be described. The reinforcement inner member 44 is configured to extend linearly in the longitudinal direction at the upper end portion of the inner member 30 and be arranged on the inward side, in the vehicle width direction, of the door glass 61. As shown in FIGS. 4, 5, 7, 11 and 13-16, the reinforcement inner member 44 is configured to have a closed-cross section (formed in a hollow shape). The reinforcement inner member 44 is provided to be separated inwardly, in the vehicle width direction, from the reinforcement outer member 43, and comprises an inner upper vertical wall portion 44a which extends linearly at an upper end portion of the closed-cross section and an inner lower vertical wall portion 44b which extends linearly at a lower end portion of the closed-cross section. The reinforcement inner member 44 is configured such that the inner upper vertical wall portion 44a is fastened to respective inward-side upper end portions, in the vehicle width direction, of the front-side vertical wall portion 41 and the rear-side vertical wall portion 42 by fastening members (not illustrated) at a single point each and the inner lower vertical wall portion 44b is fastened to respective inward-side upper end portions, in the vehicle width direction, of the front-side vertical wall portion 41 and the rear-side vertical wall portion 42 by fastening members (not illustrated) at two points each.

Figure 10:
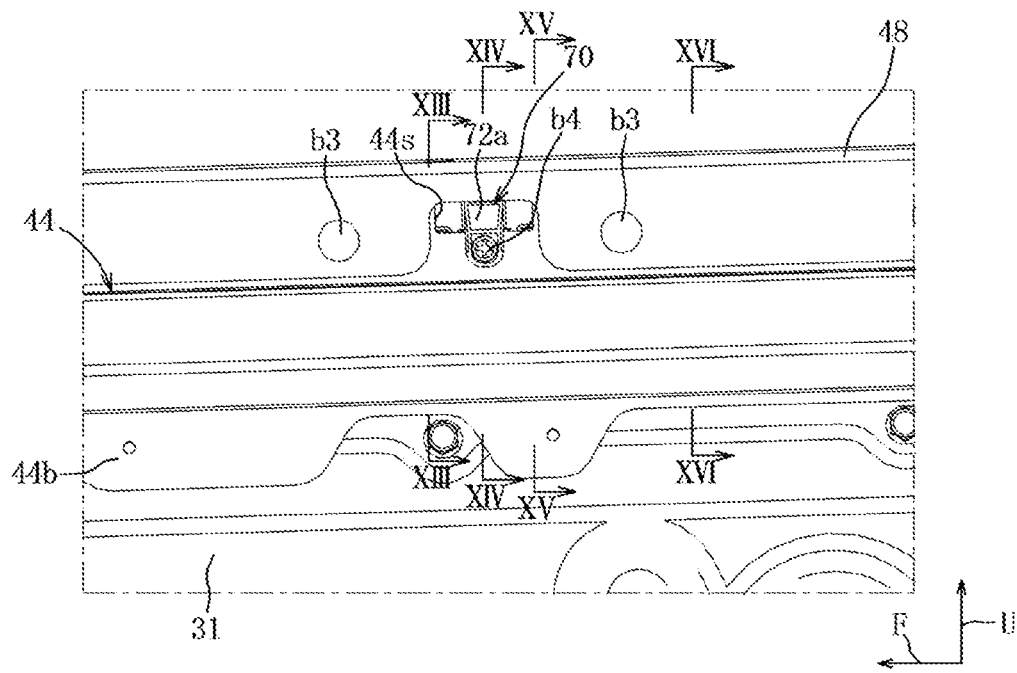
FIG. 10 is an enlarged view of a major part of FIG. 5.
Figure 11:
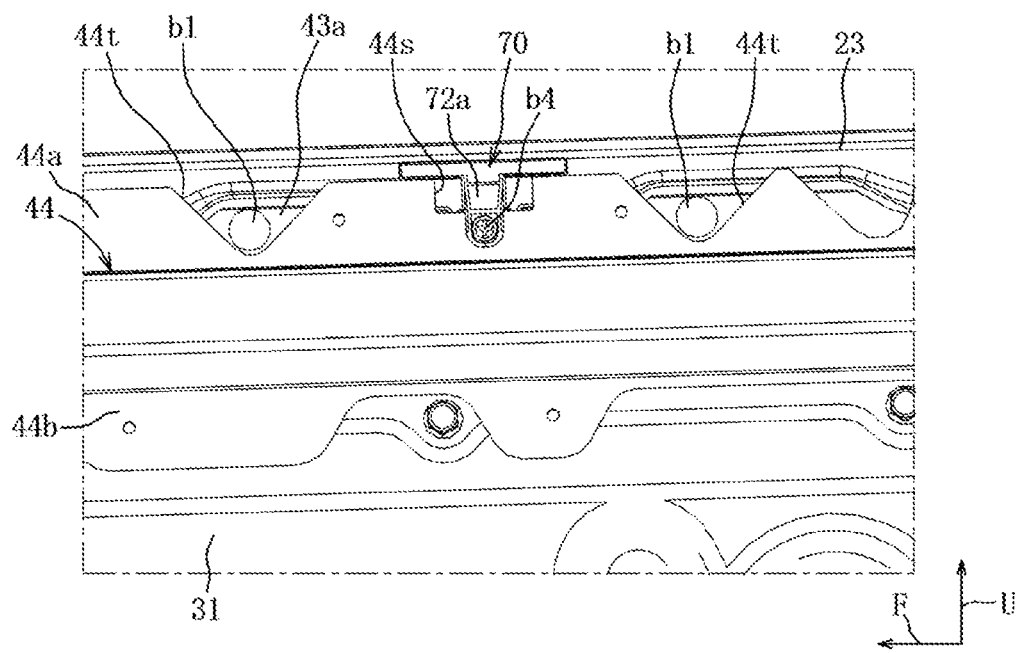
FIG. 11 is a view of portion of FIG. 10, in which the covering member is omitted.

As shown in FIGS. 7, 10 and 11, nearly rectangular-shaped two first notch portions 44s which are arranged longitudinally and nearly V-shaped plural (e.g., five) second notch portions 44t which are arranged longitudinally are formed at an upper portion of the inner upper vertical wall portion 44a, and a covering member 48 which extends longitudinally is fastened thereto by plural fastening members b3. The first notch portion 44s is configured to support a stopper member 70 to restrict the vertical movement of the door glass 61.

As shown in FIGS. 12A, 12B-15 and 19, the synthetic-resin-made stopper member 70 includes an outside leg portion 71 which has a face perpendicular to the vehicle width direction, an inside leg portion 72 which is arranged on the inward side, in the vehicle width direction, of the outside leg portion 71 and has a face perpendicular to the vehicle width direction, a taper portion 73 which is arranged between the outside let portion 71 and the inside leg portion 72, a closed portion 74 which is formed on the inward side, in the vehicle width direction, of the inside leg portion 72, and others, which are formed integrally. The longitudinal length of the stopper member 70 is set to be larger than that of the first notch portion 44s, and the longitudinal length of a fixation portion 72a, which will be described later specifically, is set to be smaller than that of the first notch portion 44s. Therefore, the stopper member 70 is supported such that its longitudinal position is changeable on the first notch portion 44.

Figure 12A:
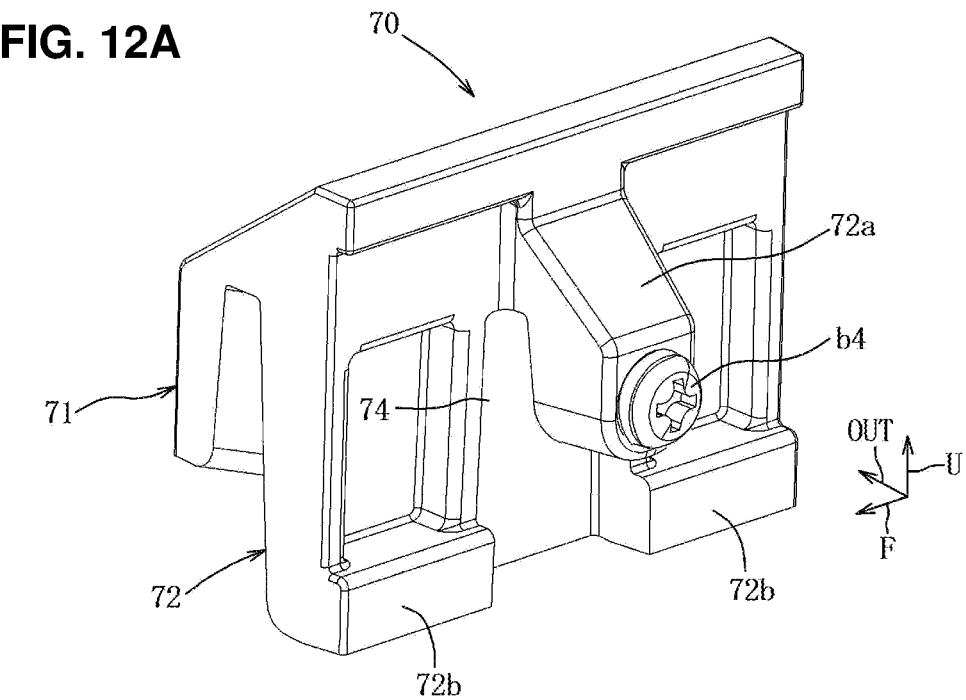
FIGS. 12A and 12B are perspective views of a stopper member.
Figure 12B:
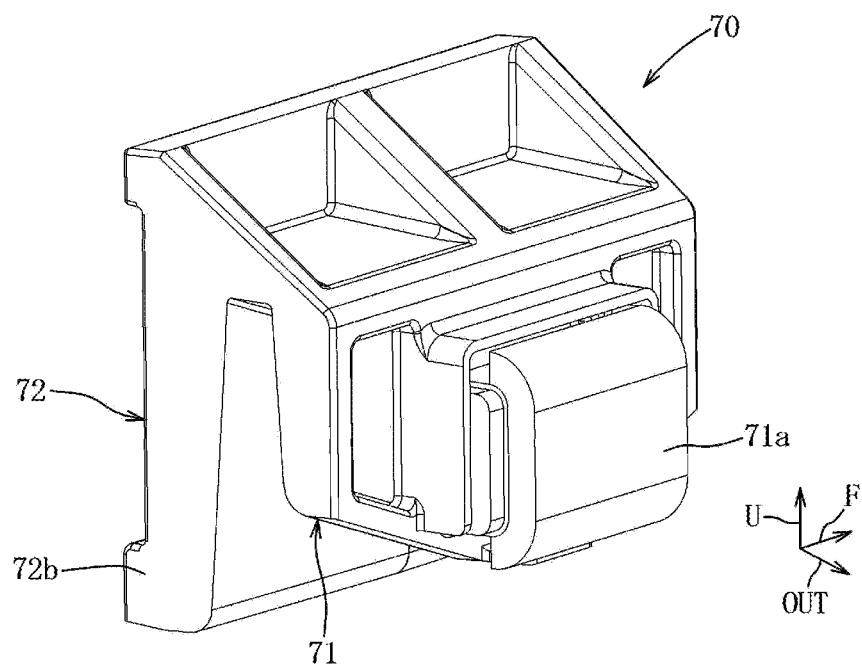
Figure 14:
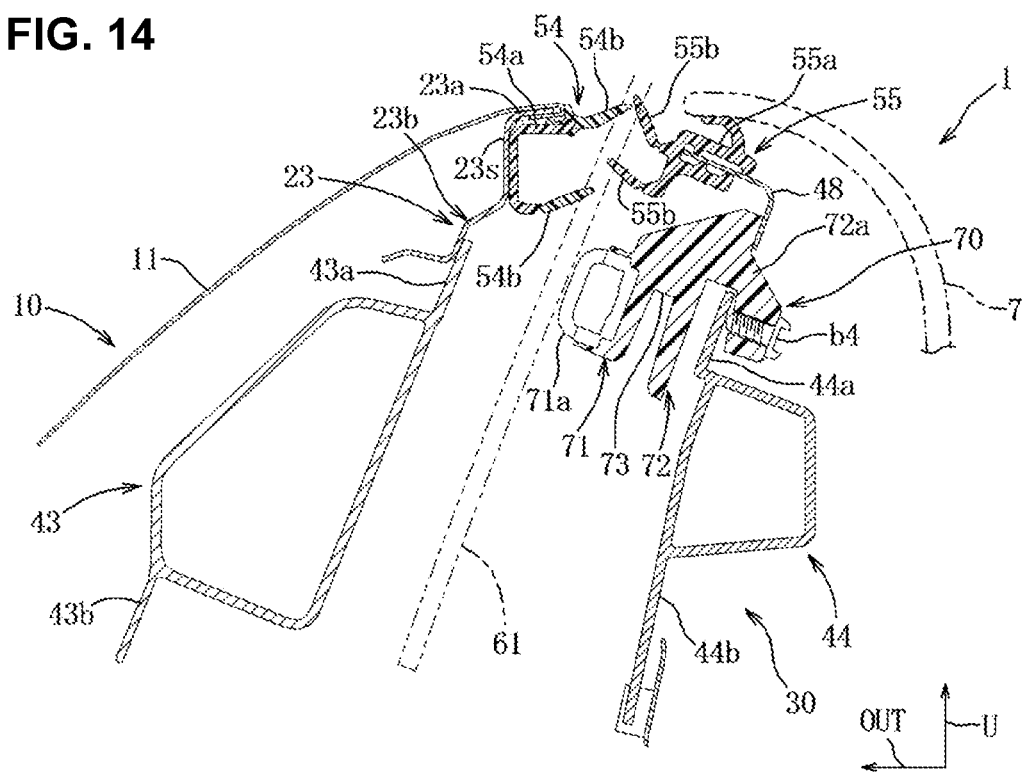
FIG. 14 is a sectional view taken along line XIV-XIV of FIG. 10.
Figure 15:
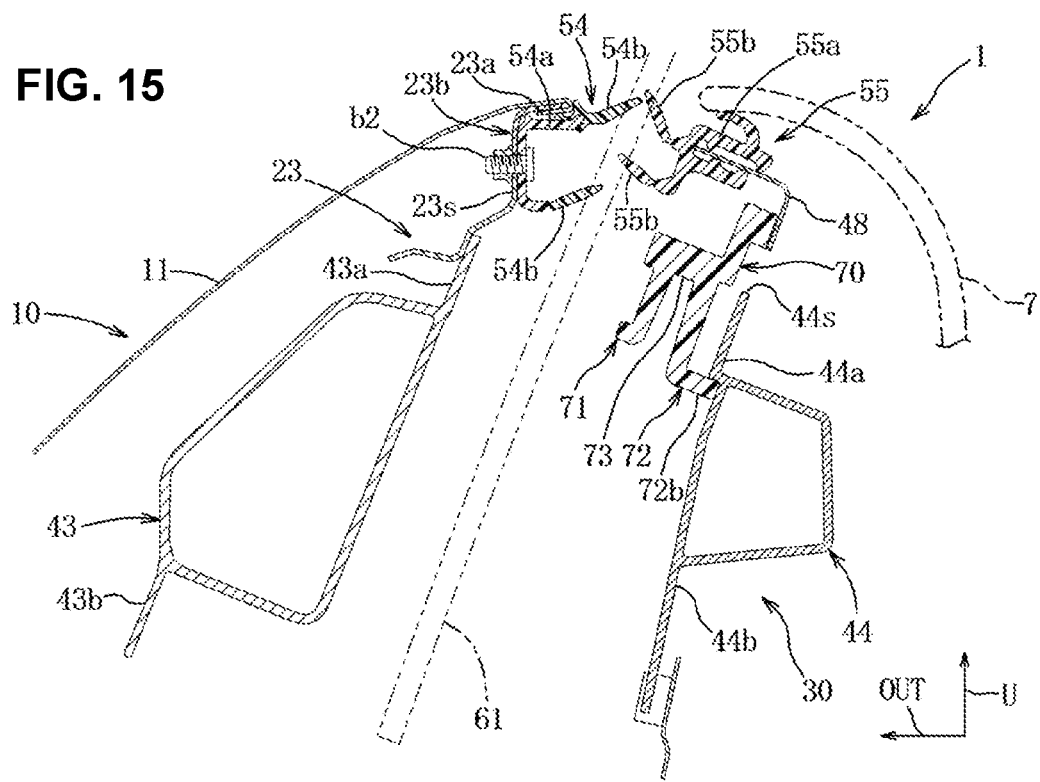
FIG. 15 is a sectional view taken along line XV-XV of FIG. 10.

As shown in FIGS. 12B and 14, the outside leg portion 71 has a stabilizer 71a which is capable of being pressed against the door glass 61 from the inward side, in the vehicle width direction, at an outward-side wall portion, in the vehicle width direction, thereof. The rubber-made or hard-synthetic-resin-made stabilizer 71a is pressed outwardly, in the vehicle width direction, against the door glass 61, sliding, so that small (micro) vibrations of the door glass 61 is suppressed during vehicle traveling.

As shown in FIGS. 12A and 13-15, the inside leg portion 72 has a fixation portion 72a and an engagement portion 72b. The fixation portion 72a is provided to extend obliquely inwardly-and-downwardly from an inner portion of an upper portion of the inside leg portion 72 such that it partially covers an upper end portion of the inner upper vertical wall portion 44a. A fastening member b4 is provided at the fixation portion 72a, and when positioning the stopper member 70 is done inside the first notch portion 44s, the fixation portion 72a and the inner upper vertical wall portion 44a are connected by the fastening member b4. The engagement portion 72b is provided to protrude inwardly, in the vehicle width direction, from an inner portion of a lower end portion of the inside leg portion 71. Since an upper end portion of the engagement portion 72b is engaged with a lower end portion of the inner upper vertical wall portion 44a, even if the stopper member 70 is pressed upwardly before fastening of the fastening member b4, the stopper member 70 is not detached from the inner upper wall portion 44a.

As shown in FIGS. 13-15 and 19, the taper portion 73 is configured in a so-called inverse-triangular shape in the side view such that the level (height position) of a central portion, in the longitudinal direction, thereof is low. Each of a pair of front-and-rear pressing members 63 which are fixed to a lower half part of the door glass 61 has a taper surface which is inclined such that its front side is located at a higher level than its rear side at an upper end portion of the pressing member 63. The closed portion 74 is configured such that an inward-side wall portion, in the vehicle width direction, thereof substantially has a face contact with an inward-side wall portion, in the vehicle width direction, of the inner upper vertical wall portion 44a despite the longitudinal position of the stopper member 70. Thereby, noises which come into the inward side, in the vehicle width direction, of the inner upper vertical wall portion 44a from the inward side, in the vehicle width direction, of the inner upper vertical wall portion 44a through a gap between the closed portion 74 and the inner upper vertical wall portion 44a is shut off.

Figure 19:
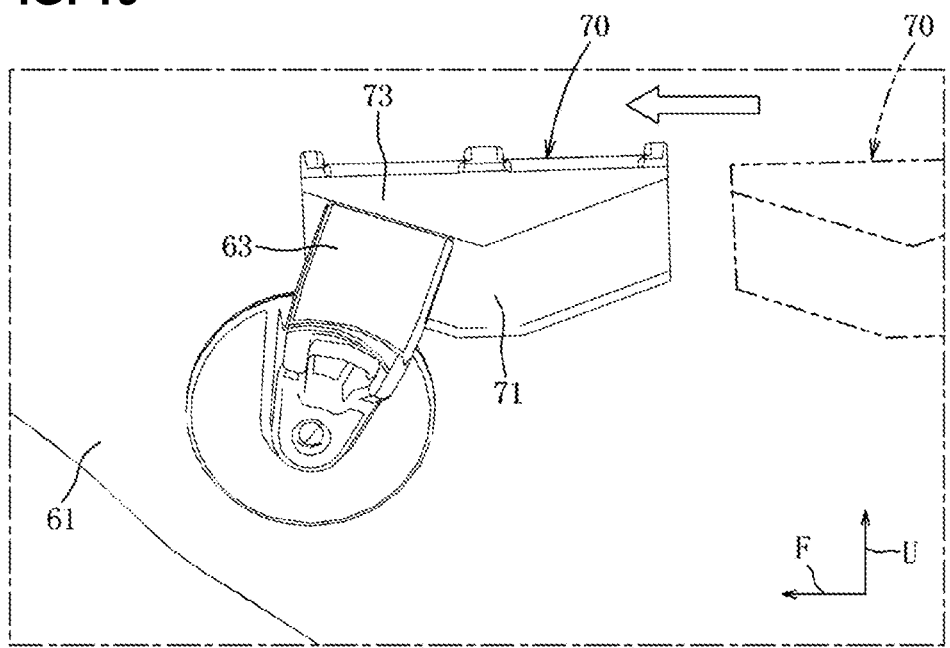
FIG. 19 is an explanatory diagram of a stopper-member fixation step.

As shown by an imaginary line in FIG. 19, the stopper member 70 is originally located at a rear end position of the first notch portion 44s and then moved forwardly toward the pressing member 63 of the door glass 61 which is located at its upper limit position. At the timing the taper surface of the pressing member 63 and the taper portion 73 contact each other, the forward moving of the stopper member 70 is stopped compulsorily by the pressing member 63, and the fixation portion 72a and the inner upper vertical wall portion 44a are fastened by the fastening member b4.

The respective second notch portions 44t are configured to correspond to the fastening portions of the reinforcement attachment portions 23t when the reinforcement inner member 44 is connected to the front-side vertical wall portion 41 and the rear-side vertical wall portion 42. Therefore, the second notch portions 44t are configured such that a work tool to rotationally drive the fastening members b1 (e.g., a nut runner or the like) is accessible to the fastening portions of the reinforcement attachment portions 23t from the inward side, in the vehicle width direction, when the upper frame portion 23 and the outer upper vertical wall portion 43a are fixedly fastened.

Figure 5:
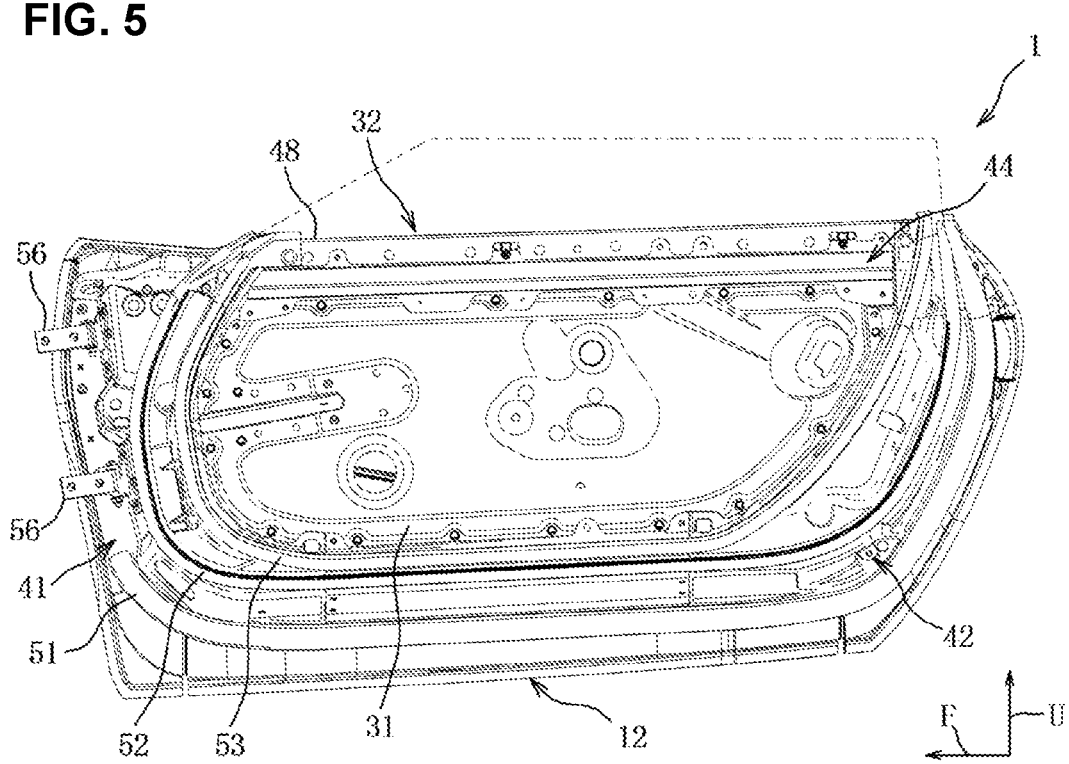
FIG. 5 is an inside view of a side door.
Figure 6:
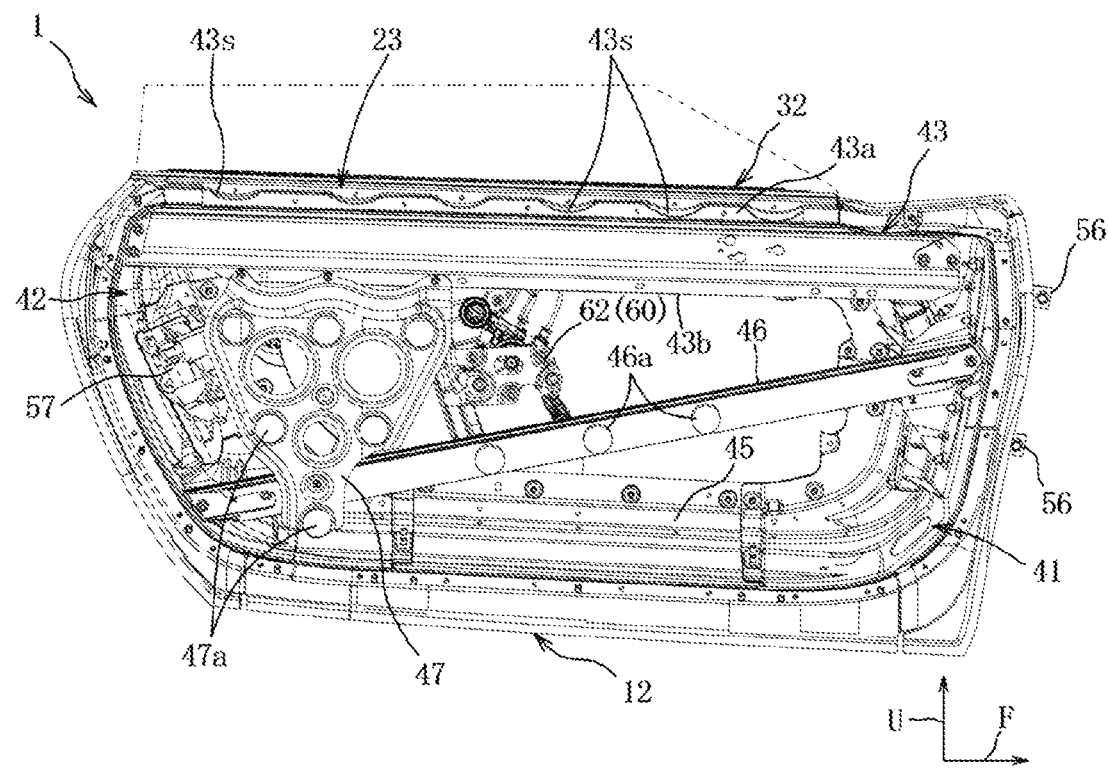
FIG. 6 is an outside view of the side door, in which an outer panel and an inner panel are omitted.

As shown in FIGS. 5, 10 and 16, the second notch portions 44t which are formed at the inner upper vertical wall portion 44a are covered with the covering member 48. The covering member 48 is configured such that it extends vertically upwardly, its upper end portion is bent outwardly, in the vehicle width direction, it has an inverse-L shaped cross section, and it is detachably attached to the inner upper vertical wall portion 44a. A pair of nearly rectangular-shaped notches which correspond to the pair of first notch portions 44s are formed at the covering member 48, The longitudinal size of this notch is set to be greater than that of the first notch portion 44s. The cover member 48 is attached to the inner upper vertical wall portion 44a by the plural fastening members b3 after a fastening work of the upper frame portion 23 and the outer upper vertical wall portion 43a and a fastening work of the stopper member 70 and the inner upper vertical wall portion 44a.

As shown in FIGS. 5-7 and 13-16, at the frame member 32 are provided the impact bar 46, a stiffener 47, first through third seal members 51-53, the beltline-seal outer member (hereafter, referred to as the seal outer member, simply) 54, a beltline-seal inner member (hereafter, referred to as a seal inner member, simply) 55, the door glass unit 60, and others. The impact bar 46 is, as described above, arranged in an inclined state such that its front side is located at the higher level than its rear side over a range from a middle stage portion of the front-side vertical wall portion 41 to a corner portion 42c of the rear-side vertical wall portion 42. Plural sealer members 46a which are capable of adhering to a back face of the outer panel 11 are provided at an outward-side wall face, in the vehicle width direction, of the impact bar 46.

The stiffener 47 is a member to secure the tensional rigidity of a rear half part of the outer panel 11. The aluminum-alloy-made stiffener 47 is configured in the inverse triangular shape in the side view, three points of its upper portion are fastened to the outer lower vertical wall portion 43b and a single point of its lower portion is fastened to the impact bar 46. Plural (e.g., three) punched portions are formed at the stiffer 47 to aim at the weight reduction, and plural sealer members 47a which are capable of adhering to the back face of the outer panel 11 are provided around these punched portions.

The first through third seal members 51-53 are respectively made of a resilient body (e.g., a rubber material) including a hollow portion. As shown in FIGS. 2, 5 and 7, the first seal member 51 is arranged at the most outer peripheral side, the second seal member 52 is arranged on an inner-peripheral side of the first seal member 51, and the third seal member 53 is arranged on the inner-peripheral side of the second seal member 52. The first seal member 51 seals a lower portion and an upper portion of the frame member 32, including the corner portion 41c against the vehicle-body side. The second and third seal members 52, 53 seal a range which extends from the front-side upper end portion to the rear-side upper end portion of the frame member 32 by way of the lower portion of the frame member 32 against the vehicle-body side.

As shown in FIGS. 8A and 13-16, the seal outer member 54 is provided to extend longitudinally and has a base portion 54a which has a nearly U-shaped cross section and a pair of upper-and-lower seal lip portions 54b which protrude upwardly from the base portion 54a. The base portion 54a includes a metal-made core material, and is made of hard synthetic resin which has the hardness of JIS-A90 or greater, for example. The lip portion 54b is made of soft synthetic resin which has the hardness of JIS-A85 or smaller, for example. The seal inner member 55 has a base portion 55a and a pair of lip portions 55b similarly to the seal outer member 54.

As shown in FIG. 2, the door glass 60 comprises the door glass 61, a regulator mechanism 62 to move the door glass 61 vertically, and so on. The regulator mechanism 62 includes a pair of front-and-rear guide rails to guide the door glass 61, a motor portion to drive the door glass 61, and others. The regulator mechanism 62 is configured such that its upper portion is fixed to the inner upper vertical wall portion 44a at two points and fixed to the inner lower vertical wall portion 44b at a single point and its lower part is fixed to the lower wall portion 45 at a single point.

Figure 13:
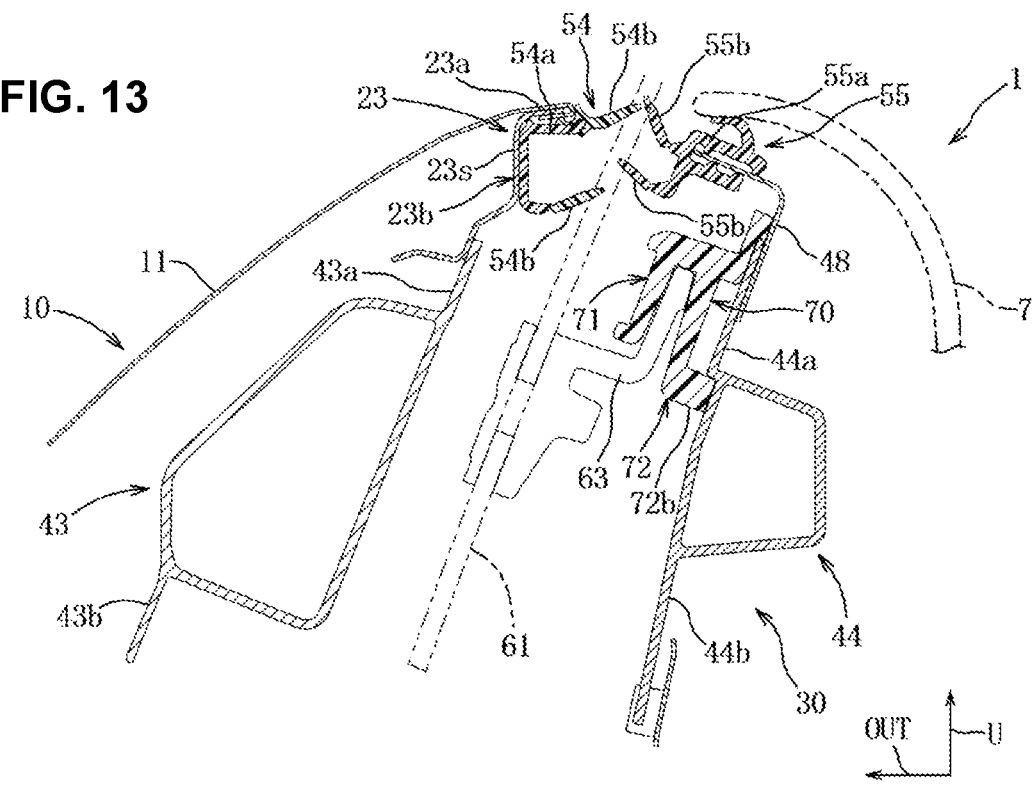
FIG. 13 is a sectional view taken along line XIII-XIII of FIG. 10.

As shown in FIG. 13, since the taper surface of the pressing member 63 has the face contact with the taper portion 73 of the stopper member 70 when the door glass 61 is located at the upper limit position, the small (micro) vibrations, in the longitudinal direction, of the door glass 61 is suppressed during vehicle traveling. At the same time, since the pressing member 63 is clamped between the outside leg portion 71 and the inside leg portion 72 of the stopper member 70 in the vehicle width direction, the small (micro) vibrations, in the vehicle width direction, of the door glass 61 is suppressed during vehicle traveling.

Next, manufacturing steps of the side door will be described referring to FIGS. 17 and 18A-18E. In the figure, Si (i=1, 2, . . . ) show these steps.

First, in the step S1, respective structural components of the outer member 10 are prepared. The outer panel 11 and the frame member 12 are prepared. The hem portion 23a and the connection wall portion 23b comprising the seal attachment portion 23s and the reinforcement attachment portion 23t are formed at the upper frame portion 23 of the frame member 12. Further, door accessories and various structural members, such as the door glass unit 60 and the stopper members 70, are prepared. Herein, the pair of pressing members 63 are previously fixed to the door glass 61.

In the step S2, the hemming method (process) is applied to the outer panel 11 and the frame member 12 at hem portions of the frame member 12 including the hem portion 23a of the upper frame portion 23, whereby the outer member 10 is formed. In the step S3, the front-side vertical wall portion 41, the rear-side vertical wall portion 42, the reinforcement outer member 43, the reinforcement inner member 44, and the lower wall portion 45 are joined, whereby an intermediate of the inner member 30 is formed. The reinforcement outer member 43 is fastened to the outside wall portions, in the vehicle width direction, of the front-side vertical wall portion 41 and the rear-side vertical wall portion 42, and the reinforcement inner member 44 is fastened to the inside wall portions, in the vehicle width direction, of the front-side vertical wall portion 41 and the rear-side vertical wall portion 42.

In the step S4, the frame member 12 of the outer member 10 and the intermediate of the inner member 11 are fastened. As shown in FIG. 18A, the outer upper vertical wall portion 43a of the reinforcement outer member 43 and the reinforcement attachment portion 23t of the connection wall portion 23b (the upper frame portion 23) are fixedly fastened by using the fastening member b1. Herein, the work tool to rotationally drive the fastening member b1 horizontally approaches the outer upper vertical wall portion 43a and the reinforcement attachment portion 23t from the inward side, in the vehicle width direction, through an area of the second notch portion 44t.

In the step S5, the seal outer member 54 is attached to the upper frame portion 23. As shown in FIG. 18A, a recess portion which is formed by the hem portion 23a and the connection wall portion 23b is formed at the upper frame portion 23 at a position below the hem portion 23a. The seal outer member 54 is arranged at the recess portion made by the hem portion 23a and the connection wall portion 23b, specifically the seal attachment portion 23s, and fastened from the inward side, in the vehicle width direction, and an upper side of the reinforcement inner member 44 by using the fastening members b2.

In the step S6, the door glass unit 60 is placed at the inner member 30. The regulator mechanism 62 is fixedly fastened to the reinforcement inner member 44 and the lower wall member 45. The door glass 61 is elevated by rotationally driving the motor of the regulator mechanism 62, and the door glass 61 is stopped at the upper limit position by using a glass positioning tool (not illustrated). Then, as shown in FIG. 18B, the pair of front-and-rear stopper members 70 are placed at the rear-end position of each of the pair of front-and-rear first notch portions 44s.

In the step S7, each of the stopper members 70 is fixedly positioned. As shown in FIG. 18C, the stopper member 70 placed at the rear-end position of the first notch portion 44s is made to slide forwardly, so that the tape face of the pressing member 63 fixed at the door glass 61 and the taper portion 73 of the stopper member 70 contact each other. Thereby, the forward sliding of the stopper member 70 is stopped. As shown in FIG. 18d, after the stopper member 70 is stopped, the fixation portion 72a is fixedly fastened to the inner upper vertical wall portion 44a by the fastening member b4.

In the step S8, the covering member 48 is attached to the inner upper vertical wall portion 44a. As shown in FIG. 18D, a lower portion of the covering member 48 which is previously attached to the seal inner member 55 is provided to overlap with the inner upper wall portion 44a from the inward side, in the vehicle width direction and then fastened by using the fastening member b3. In the step S9, the inner panel 31 is attached to the flange portions 41f, 42f, the inner lower vertical wall portion 44b, and others. Finally, as shown in FIG. 18E, a door trim 7 is attached to an inside wall portion of the inner member 30 by fasteners (not illustrated).

Next, the operations and effects of the side door structure of the vehicle V will be described. According to the present side door structure, since this side door structure comprises the reinforcement outer member 43 extending in the vehicle longitudinal direction at the upper end portion of the inner member 30 which is positioned on the outward side, in the vehicle width direction, of the door glass 61, the rigidity of the portion around the upper end portion of the inner member 30 can be secured. Further, since the outer member 10 includes the outer panel 11 and the annular frame member 12 which is joined to the outer peripheral portion of the outer panel 11 by the hemming process method, the outer panel 11 and the frame member 12 can be joined without generating wrinkles or distortion at the outer panel 11 forming the design surface portion. Since the reinforcement outer member 43 is connected to the inner member 30 at its front-and-rear end portions, the front-and-rear end portions of the reinforcement outer member 43 can be supported firmly at the upper end portion of the inner member 30. Moreover, since the seal outer member 54 to seal the gap between the outer member 10 and the door glass 61 is supported at the reinforcement outer member 43, the seal outer member 54 can be arranged at the inner-peripheral side lower portion of the outer panel 11, so that it can be prevented that the seal outer member 54 is visible from the outside. Also, since the seal outer member 54 is supported at the reinforcement outer member 43 having the high rigidity, the attachment rigidity of the seal outer member 54 can be made high, so that the contact pressure of the lip portions 54b against the door glass 61 can be secured.

The reinforcement outer member 43 is formed by extrusion molding so as to have the closed-cross section, the frame member 12 includes the upper frame portion 23 which comprises the hem portion 23a which is joined to the upper-side edge portion of the outer panel 11 by the hemming method and the connection wall portion 23b which is provided to extend below the hem portion 23a and attached to the seal outer member 43, and the seal outer member 54 is attached to the reinforcement outer member 43 via the upper frame portion 23. Thereby, the seal outer member 43 can be attached to the upper frame portion 23 which is configured such that its upper portion is supported at the outer panel 11 and its lower portion is supported at the reinforcement outer member 43, so that the attachment rigidity of the seal outer member 54 can be further increased.

The upper frame portion 23 is configured such that the inward end portion, in the vehicle width direction, of the hem portion 23a is formed substantially in the curved shape along the door glass 61 and the connection wall portion 23b is formed substantially in the linear shape along the outer vertical wall portion 43a which extends upwardly from the hollow portion of the reinforcement outer member 43, the seal outer member 54 includes the pair of upper-and-lower lip portions 54b which are contactable with the door glass 61 and the base portion 54a which connects the respective outward portions, in the vehicle width direction, of the pair of lip portions 54b, and the base portion 54a is attached to the connection wall portion 23b which is arranged on the outward side, in the vehicle width direction, of the hem portion 23a. Thereby, the seal outer member 54 which has substantially the curved shape along the door glass 61 can be supported at the nearly-linear outer vertical wall portion 43a via the connection wall portion 23b.

The connection wall portion 23b comprises the plural seal attachment portions 23s where the seal outer member 54 is fastened and the plural reinforcement attachment portions 23t which are fastened to the outer vertical wall portion 43a, and the boundary portions between the plural seal attachment portions 23s and the plural reinforcement attachment portions 23t are formed in the wave shape in the side view. Thereby, the plural seal attachment portions 23s having the nearly curved-shaped cross section and the plural reinforcement attachment portions 23t having the nearly linear-shaped cross section can be allow to coexist inside the connection wall portion 23b with a simple structure.

The present side door structure further comprises the reinforcement inner member 44 extending in the vehicle longitudinal direction at the upper end portion of the inner member 30 which is positioned on the inward side, in the vehicle width direction, of the door glass 61 and the covering member 48 attached to the upper portion of the reinforcement inner member 44, and the covering member 48 is configured to be detachable for the reinforcement inner member 44. Thereby, the attachment workability of the seal outer member 54 can be improved.

The present side door manufacturing method comprises the step S2 of forming the outer member 10 by the outer panel 11 and the annular frame member 12 which is joined to the outer peripheral portion of the outer panel 11 by the hemming method, the step S3 of connecting the reinforcement outer member 43 to the inner member 30 at its front-and-rear end portions and connecting the reinforcement inner member 44 extending in the vehicle longitudinal direction at the upper end portion of the inner member 30 which is positioned on the inward side, in the vehicle width direction, of the door glass 61 to the inner member 30 at its front-and-rear end portions, the step S4 of fastening the inner member 30 to the frame member 12 from the inward side, in the vehicle width direction, the step S5 of fastening the seal outer member 54 to seal the gap between the outer member 10 and the door glass 61 to frame member 12 from the inward side, in the vehicle width direction, and the step S8 of attaching the detachable covering member 48 to the upper portion of the reinforcement inner member 43. Thereby, since the seal outer member 54 is arranged at the upper end portion of the inner member 30 and fastened to the reinforcement outer member 43 connected to the inner member 30 at its front-and-rear end portions, the attachment rigidity of the seal outer member 54 can be increased, so that the seal outer member 54 can be arranged at the inner-peripheral side lower portion of the outer panel 11. Further, since the detachable covering member 48 is attached to the upper portion of the reinforcement inner member 44, the seal outer member 54 can be attached after connecting the outer member 10 and the inner member 30, so that the workability can be improved.

Finally, modifications where the above-described embodiment are changed partially will be described.

1] While the above-described embodiment exemplifies the sashless (non-sash) type of side door 1 of the two-door hard top type of passenger car, any type of vehicle is selectable and also the present invention is applicable to a sash type of side door.

2] While the above-described embodiment exemplifies the outer member 10 and the inner member 30 which are made of the aluminum-alloy material primarily, any material capable of achieving the weight-reduction effect at least, such as magnesium alloy, is useable.

3] The present invention should not be limited to the above-described example and modifications and any other modifications or improvements may be applied within the scope of a spirit of the present invention.

What is claimed is:

1. A side door structure of a vehicle, comprising:
an outer member;
an inner member connected to the outer member;
door components including a door glass provided between the outer member and the inner member; and
a beltline-reinforcement outer member extending in a vehicle longitudinal direction at an upper end portion of said inner member which is positioned on an outward side, in a vehicle width direction, of the door glass,
wherein said outer member includes an outer panel and an annular frame member which is joined to an outer peripheral portion of the outer panel by a hemming method, said beltline-reinforcement outer member is connected to said inner member at a front end portion and a rear end portion, in the vehicle longitudinal direction, thereof, and a beltline-seal outer member to seal a gap between the outer member and the door glass is supported at said beltline-reinforcement outer member.

2. The side door structure of the vehicle of claim 1, wherein said beltline-reinforcement outer member is formed by extrusion molding so as to have a closed-cross section, said frame member includes a connecting member which comprises a hem portion which is joined to an upper-side edge portion of said outer panel by hemming method and a connection wall portion which is provided to extend below the hem portion and attached to said beltline-seal outer member, and said beltline-seal outer member is attached to said beltline-reinforcement outer member via said connecting member.

3. The side door structure of the vehicle of claim 2, wherein said connecting member is configured such that an inward end portion, in the vehicle width direction, of said hem portion is formed substantially in a curved shape along the door glass and said connection wall portion is formed substantially in a linear shape along a vertical wall portion which extends upwardly from a hollow portion of said beltline-reinforcement outer member, said beltline-seal outer member includes a pair of upper-and-lower lip portions which are contactable with the door glass and a base portion which connects respective outward portions, in the vehicle width direction, of the pair of lip portions, and said base portion is attached to said connection wall portion which is arranged on the outward side, in the vehicle width direction, of said hem portion.

4. The side door structure of the vehicle of claim 3, wherein said connection wall portion comprises plural seal attachment portions where said beltline-seal outer member is fastened and plural reinforcement attachment portions which are fastened to said vertical wall portion, and boundary portions between said plural seal attachment portions and said plural reinforcement attachment portions are formed in a wave shape in a side view.

5. The side door structure of the vehicle of claim 4, further comprising a beltline-reinforcement inner member extending in the vehicle longitudinal direction at the upper end portion of said inner member which is positioned on an inward side, in the vehicle width direction, of the door glass and a covering member attached to an upper portion of said beltline-reinforcement inner member, and said covering member is configured to be detachable for said beltline-reinforcement inner member.

6. The side door structure of the vehicle of claim 2, wherein said connection wall portion comprises plural seal attachment portions where said beltline-seal outer member is fastened and plural reinforcement attachment portions which are fastened to said vertical wall portion, and boundary portions between said plural seal attachment portions and said plural reinforcement attachment portions are formed in a wave shape in a side view.

7. The side door structure of the vehicle of claim 2, further comprising a beltline-reinforcement inner member extending in the vehicle longitudinal direction at the upper end portion of said inner member which is positioned on an inward side, in the vehicle width direction, of the door glass and a covering member attached to an upper portion of said beltline-reinforcement inner member, and said covering member is configured to be detachable for said beltline-reinforcement inner member.

8. The side door structure of the vehicle of claim 3, further comprising a beltline-reinforcement inner member extending in the vehicle longitudinal direction at the upper end portion of said inner member which is positioned on an inward side, in the vehicle width direction, of the door glass and a covering member attached to an upper portion of said beltline-reinforcement inner member, and said covering member is configured to be detachable for said beltline-reinforcement inner member.

9. The side door structure of the vehicle of claim 6, further comprising a beltline-reinforcement inner member extending in the vehicle longitudinal direction at the upper end portion of said inner member which is positioned on an inward side, in the vehicle width direction, of the door glass and a covering member attached to an upper portion of said beltline-reinforcement inner member, and said covering member is configured to be detachable for said beltline-reinforcement inner member.

10. A side door manufacturing method of a vehicle which comprises an outer member, an inner member connected to the outer member, and a beltline-reinforcement outer member extending in a vehicle longitudinal direction at an upper end portion of the inner member which is positioned on an outward side, in a vehicle width direction, of a door glass, the side door manufacturing method comprising steps of:
forming said outer member by an outer panel and an annular frame member which is joined to an outer peripheral portion of the outer panel by a hemming method;
connecting said beltline-reinforcement outer member to said inner member at a front end portion and a rear end portion, in the vehicle longitudinal direction, thereof, and connecting a beltline-reinforcement inner member extending in the vehicle longitudinal direction at the upper end portion of the inner member which is positioned on an inward side, in the vehicle width direction, of the door glass to said inner member at a front end portion and a rear end portion, in the vehicle longitudinal direction, thereof;
fastening said inner member to said frame member from the inward side, in the vehicle width direction;
fastening a beltline-seal outer member to seal a gap between said outer member and said door glass to frame member from the inward side, in the vehicle width direction; and
attaching a detachable covering member to an upper portion of said beltline-reinforcement inner member.

* * * * *